(12) United States Patent
Kleppner et al.

(10) Patent No.: US 6,305,417 B1
(45) Date of Patent: Oct. 23, 2001

(54) RESERVOIR FOR FUEL FEEDING MODULE, AND FUEL FEEDING MODULE PROVIDED WITH THE SAME

(75) Inventors: Stephan Kleppner, Bretten; Dieter Schreckenberger, Marbach, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/613,203

(22) Filed: Jul. 11, 2000

(30) Foreign Application Priority Data

Jul. 13, 1999 (DE) .............................................. 199 32 684

(51) Int. Cl.[7] ..................................................... B67D 5/56
(52) U.S. Cl. ................................. 137/565.34; 137/565.22; 123/509; 123/514
(58) Field of Search ........................ 137/565.22, 565.34, 137/574, 576; 123/509, 514

(56) References Cited

U.S. PATENT DOCUMENTS

| 4,869,225 | * | 9/1989 | Nagata et al. ......................... 123/509 |
| 5,016,670 | * | 5/1991 | Sasaki et al. ......................... 137/574 |
| 5,107,889 | * | 4/1992 | Sasaki et al. ......................... 137/574 |
| 5,680,847 | * | 10/1997 | Begley et al. ......................... 123/509 |
| 5,809,975 | * | 9/1998 | Tuckey et al. ......................... 123/509 |
| 6,155,793 | * | 12/2000 | Tuckey et al. ................... 123/509 X |

* cited by examiner

Primary Examiner—John Rivell
(74) Attorney, Agent, or Firm—Michael J. Striker

(57) ABSTRACT

A reservoir for feeding module has a tubular cylinder part, and a bottom part joined to the tubular cylinder part, the tubular cylinder part and the bottom part having joining surfaces on which functional surfaces and feeding passages are formed.

16 Claims, 3 Drawing Sheets

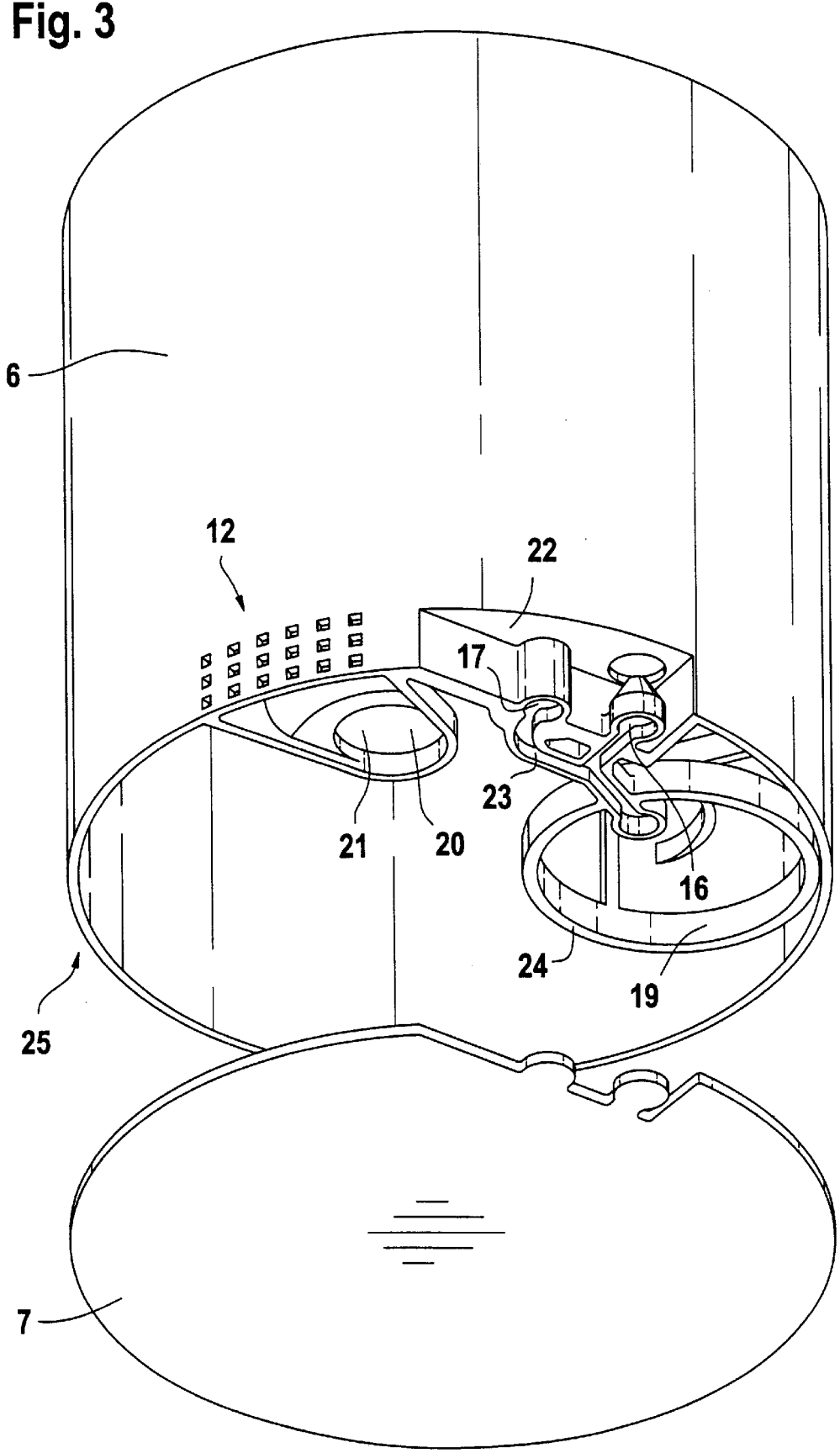

RESERVOIR FOR FUEL FEEDING MODULE, AND FUEL FEEDING MODULE PROVIDED WITH THE SAME

BACKGROUND OF THE INVENTION

The present invention relates to a reservoir for a feeding module which for example feeds liquids, such as fuel and has a number of inserts. It also relates to a feeding module provided with such a reservoir.

With known configurations of feeding modules which are arranged in a supply tank, a container is composed of a tubular synthetic plastic part which is produced by extrusion and a bottom part which seals it. The tubular synthetic plastic part receives a feeding aggregate which aspirates fuel from a suction chamber near the bottom part and feeds it to the internal combustion engine. A chamber is separated in the tubular synthetic plastic part, which extends along the longitudinal axis of the synthetic plastic part and is connected with a supply tank through an opening in the bottom part. In the partial chamber a float of a filling level sensor is arranged.

The feeding module which is configurated in this way with a reservoir which surrounds the feeding aggregate must be actively filled, and for this purpose suction jet pumps can be utilized. They are connected as a rule with elastic conduits or hoses, which represent additional components and take reservoir volume, whose limitation in some applications can be undesirable.

SUMMARY OF THE INVENTION

Accordingly, it is an object of the present invention to provide a reservoir for a feeding module, which avoids the disadvantages of the prior art.

In keeping with these objects and with others which will become apparent hereinafter, one feature of present invention resides, briefly stated, in a reservoir for a feeding module, in which functional surfaces as well as feeding passages are formed on joining surfaces of a tubular cylinder part and a bottom part.

With the sealing surfaces and passage surfaces formed in the reservoir components to be joined, separate hoses and conduits in reservoir can be dispensed with. Furthermore, the receiving cap and openings for the inserts are provided already in the tubular cylinder part and the bottom part, which for example can be formed as synthetic injection molded parts produced in mass production. When in corresponding embodiments of the reservoir the openings for the suction jet pump are not needed, they can be injection molded or not made during the manufacture of the corresponding parts. In the same way, the not required openings can be provided with plugs and thereby closed.

In an advantageous manner, the functional surfaces on the components to be joined can be formed as sealing surfaces or as closing surfaces. Feeding passage components can be formed in the tubular cylinder part at the joining surfaces, and in the bottom part of the reservoir the corresponding passage bottoms which close the feeding passage can be provided.

Receiving surfaces for at least one feeding element, for example the reservoir of the actively filling suction jet pump, can be formed for example on the tubular cylinder part. Also, connecting surfaces and cap surfaces for a fuel feeding aggregate can be formed in the tubular cylinder part, as well as receiving surfaces and feeding openings for a filling valve. A preliminary screen can be provided in the cylinder wall of the tubular cylinder part, which retains impurities from the passage of the filling valve.

In addition to receiving and sealing surfaces on the tubular cylinder part, these surfaces can be also formed on the bottom part of the reservoir. During joining of the both components, the passage bottoms which closess the feeding passage upper part on the tubular cylindrical part is located, also provide the sealing surfaces for the filling valve relative to the tank bottom, as well as the sealing surfaces for fuel feeding aggregate which is received in the tubular cylinder part.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a perspective view of receiving surfaces and a cap for inserts on a tubular cylinder part of the inventive reservoir for a feeding module.

DESCRIPTION OF PREFERRED EMBODIMENTS

Figure 1:
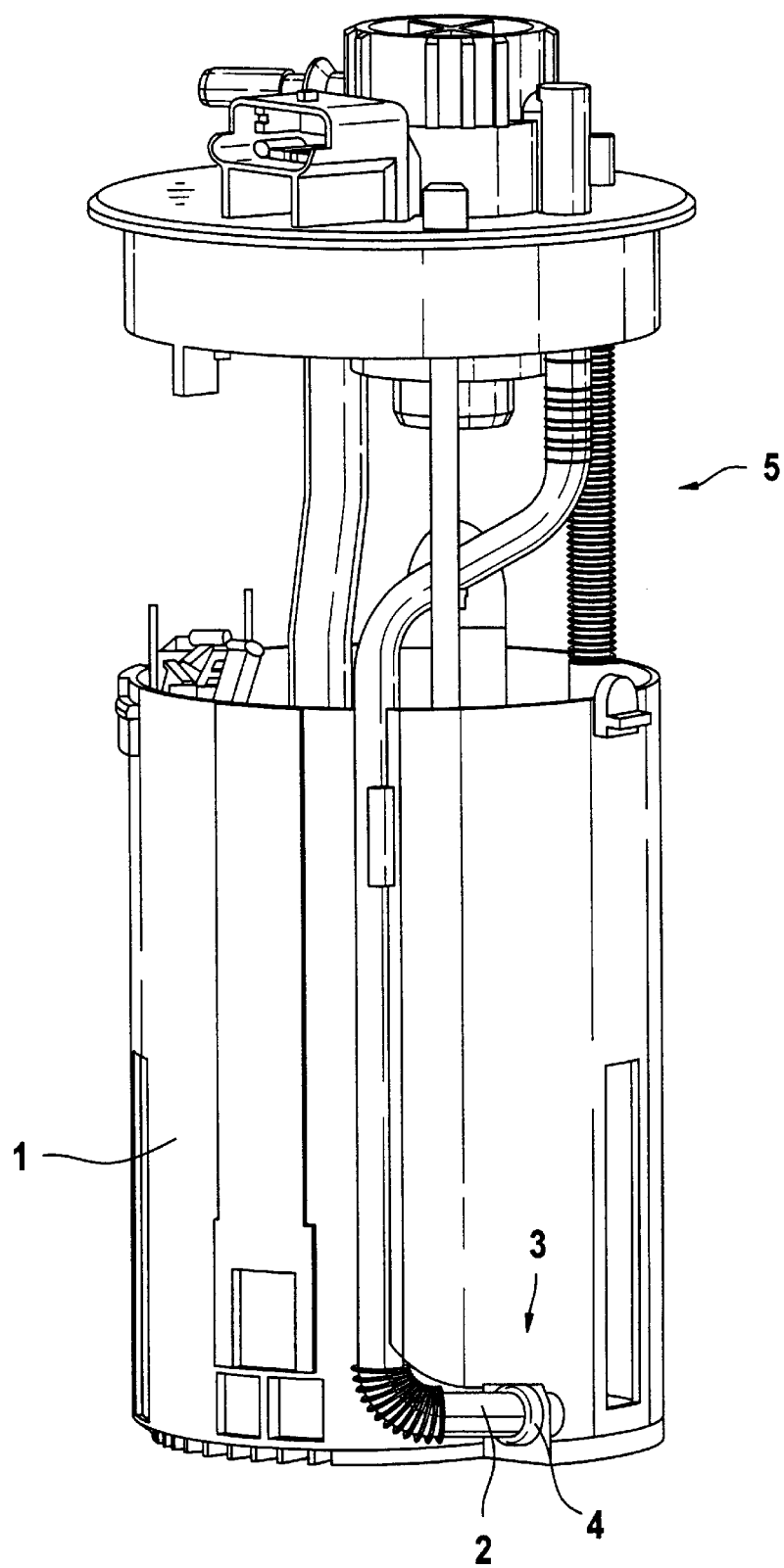
FIG. 1 is a view showing a reservoir for feeding aggregate in accordance with the prior art, with elastic conduits or hoses extending through a cup to a suction jet pump.

FIG. 1 shows a two-part cup in accordance with prior art. It has a cup element 1 which is closeable by a cover element. An elastic hose conduit 2 extends through it. It is connected to a connector 3, for example with a suction jet pump. In correspondence with the conductor course 5 as shown in FIG. 1 the conductors 2 occupy in the cup a volume which limits the net filling quantity of the cup 1. Furthermore, the connecting conduits 2 in certain sections are substantially bent, which can lead to a premature material fatigue.

Figure 2:
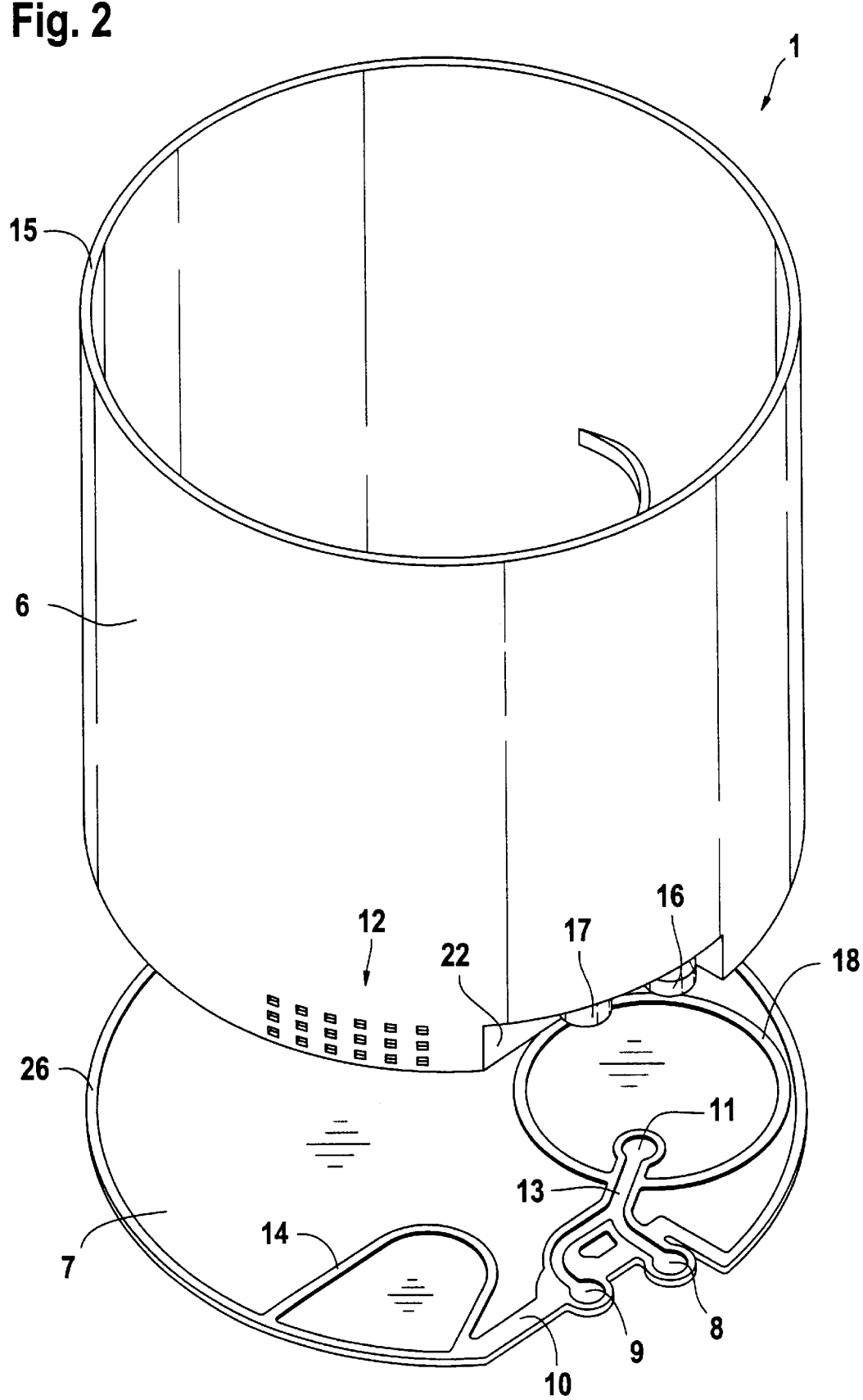
FIG. 2 is a perspective plan view on a bottom part of a reservoir for a feeding module, located under a tubular cylinder part in accordance with the present invention.

FIG. 2 shows a perspective plan view of a bottom part of the reservoir in accordance with the present invention, which is located under a tubular cylinder upper part. The reservoir 1 is composed of two parts which are connected with one another by a joining process, namely the tubular cylindrical part 6 and the plate-shaped bottom part 7. The tubular cylindrical part 6 can be composed of metal or formed as a synthetic plastic injection molded part. The bottom part 7 can be formed the same way. Receiving surfaces 8, 9 for feeding elements 16, 17, for example suction jet pumps can be formed in a recess 22 in a lower region of the tubular cylinder part 6. A preliminary sieve 12 is inserted in the lower region of the tubular cylinder part 6. It retains impurities contained in the flowing-in fuel from the filling valve of the reservoir 1.

Functional surfaces are formed in the bottom part 7 as shown in FIG. 2. The functional surfaces on the bottom part 7 include, on the one hand, sealing surfaces 10, 14, 18 for inserts, such as for example a filling valve or a fuel feeding aggregate or also a peripheral web formed as a joining surface 26 for the tubular cylinder part 6. Furthermore, passage bottoms 13 are formed in the bottom part 7 of the reservoir 1, and also represent the functional surfaces. The passage surfaces 14 are limited by lateral webs and extend from the connecting points 8, 9 which receive the feeding elements 16, 17 to a knot point, from which a passage extends to the sealing surface 18 in the bottom part 7. The sealing surface 18 seals the feeding aggregate which is received in the connecting surfaces on the tubular sealing part, for example an electric fuel pump. The bottom part 7 is therefore designed so that its sealing surfaces 10, 14 and 18 are located opposite to the inserts provided in the tubular cylinder part 6 and seal them during further joining of the tubular cylinder part 6 and the bottom part 7.

The joining of the tubular cylinder part 6 and the bottom part 7 can be performed in a thermal manner, for example by welding of the tubular cylinder part 6 and the bottom 7 at the joining surfaces 26 or 27. Another joining process includes a material-closing glueing of the tubular cylinder part 6 with the bottom part 7 at the joining surfaces 26 or 27. The joining surfaces 26 or 27 on the components 6, 7 of the reservoir 1 can be formed smooth or engaging in one another with projections and grooves for fixing the relative position of the bottom part 7 and the tubular cylinder part 6, depending on the corresponding embodiment.

The bottom surface of the bottom part 7 is provided in a side region with the connecting surfaces 8, 9, which receive the inserts received in the tubular cylinder part 6, for example suction jet pumps. Depending on whether the tubular cylinder part 6 has one or two suction jet pumps 16 or 17, during the manufacture of the bottom part 7 both surfaces 8, 9, are provided with openings, or when only one suction jet pump 16 or 17 is provided only one opening is produced. The other opening remains closed or is closeable by a correspondingly inserted plug.

FIG. 3 shows a perspective view of the receiving surfaces and a cap for the inserts in a tubular cylinder part. In this view of the tubular cylinder part 6 which is inclined from below, a cap is formed on the side wall 15 of the tubular part 16 in the region of the preliminary sleeve 12. An opening 21 is formed in the cap and opens into a filling valve 20. The course of the cap, in which filling valve 20 is received, corresponds to the sealing surface 14 provided on the bottom part 7. In addition to the cast or injection molded cap element for the receiving of the filling valve 20, on the tubular cylinder part 6 a recess 22 is provided. The receiving surfaces for the first and in some cases the further suction jet pumps 16 or 17 are provided in the opening 22. Depending on the configuration of the reservoir 1, one or several suction jet pumps 16, 17 can be integrated in the tubular cylinder part 6 in the region of the recess.

Passage upper parts 22 formed in the tubular cylinder part 6 extend from the connecting or receiving surfaces for the suction jet pump 16, 17. They are limited at two sides by the webs relative to the cap 19, which receives the feeding aggregate for feeding the fuel. The passage upper parts 23 formed in the tubular cylinder part 6 are closed and sealed by the passage bottoms 13 formed in the bottom part 7 as shown in FIG. 2, when the reservoir 1 is assembled from the tubular cylinder part 6 and the bottom part 7 which are joined together, so that the passages which feed the fuel are formed without separate conduit elements. Conduits and hoses, which extend in the prior art illustrated in FIG. 1 through the interior and exterior of the reservoir 1 can be dispensed with. Thereby the volume of the reservoir 1 which is filled with the fuel increases, and this can be used for reducing the structural dimensions of the reservoir 1. The hoses and conduits inside the reservoir are dispensed with, and therefore the fuel receiving capacity is greater. Furthermore, the mounting in the tank is substantially simplified.

A contact surface 24 is formed on the socket 19 which represents the receiving circuit for the fuel feeding aggregate. During joining of the tubular cylinder part 6 with the bottom part 7 on its joining surfaces 25 and 26, it seals the received fuel feeding aggregate around the supply passage 11 by a seal 18 in the bottom part 7. The configuration of the reservoir 1 with the two feeding elements 16, 17, such as for example suction jet pumps, can be required for example in variants with a saddle tank, for feeding the fuel from the second half into the first half, and vice versa. When to the contrary one of the connecting surfaces 8, 9 for the feeding elements 16 or 17 is not needed, then it can be injection molded or closed with a separately insertable plug.

Since the tubular cylinder part 6 and the bottom part 7 are provided correspondingly with mutually determined courses of the joining surfaces 25 or 26 as well as the sealing surfaces 10, 14, 18 and receiving surfaces 8, 9, 19, therefore during joining of the reservoir 1 a reliable sealing of the part is guaranteed. The integrated passages of the fuel supply are formed in a reservoir unit 1 without separate hoses or conduits.

The reservoir units assembled from the tubular cylinder part 6 and the bottom part 7 can be positioned in a fuel tank of the vehicle, so that the filling is first performed through the filling valve 20 located in the lower region laterally in the cylinder wall 15, via the preliminary filter 12. The receiving surfaces 8, 9, or depending on the embodiment one or two openings, supply the reservoir 1 actively via the feeding element 16, 17 formed for example as suction jet pumps. The reservoir 1 composed of the tubular cylinder part 6 and the bottom part 7 joined to it, forms a compact structural unit which after assembly with the inserted fuel feeding aggregate, filling valve as well as one or more suction jet pumps 16, 17, forms a compact pre-mountable fuel feeding module.

It will be understood that each of the elements described above, or two or more together, may also find a useful application in other types of constructions differing from the types described above.

While the invention has been illustrated and described as embodied in a reservoir, and a feeding module, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A reservoir for a feeding module, comprising a tubular cylinder part; a bottom part joined to said tubular cylinder part, said parts receiving a fuel feeding aggregate and feeding elements for filling the reservoir, said tubular cylinder part and said bottom part having joining surfaces on which functional surfaces and feeding passages are formed.

2. A reservoir as defined in claim 1, wherein said functional surfaces include sealing surfaces.

3. A reservoir as defined in claim 1, wherein said functional surfaces include connecting surfaces which are formed to receive inserts.

4. A reservoir as defined in claim 1, wherein said joining surface of said tubular cylinder part is provided with upper parts of the feeding passages.

5. A reservoir as defined in claim 4, wherein said joining surface of said bottom part is provided with bottom parts of the feeding passages.

6. A reservoir as defined in claim 1, wherein said receiving surfaces are formed on said joining surface of said tubular cylinder part so as to receive at least one feeding element.

7. A reservoir as defined in claim 6, wherein said at least one feeding element is formed as a suction jet pump.

8. A reservoir as defined in claim 1, wherein said joining surface on said tubular cylinder part is formed as a connecting surface for a fuel feeding aggregate with a preliminary sieve.

9. A reservoir as defined in claim 1, wherein said joining surface of said tubular cylinder part is formed as a receiving surface for a filling valve.

10. A reservoir as defined in claim 9; and further comprising a preliminary sieve associated with said filling valve on said tubular cylinder part.

11. A reservoir as defined in claim 1, wherein said joining surface of said bottom part is formed as a sealing surface for a fuel feeding aggregate.

12. A reservoir as defined in claim 1, wherein said joining surface of said bottom part is formed as a sealing surface for a filling valve.

13. A reservoir as defined in claim 1, wherein said joining surface of said bottom part is provided with webs which limit bottom parts of the feeding passages.

14. A reservoir as defined in claim 1; and further comprising welding means which connect said joining surfaces with one another.

15. A reservoir as defined in claim 1; and further comprising adhesive means which glue said joining surface with one another.

16. A fuel feeding module, comprising a reservoir including a tubular cylinder part and a bottom part which is joined to said cylinder part, said parts being formed so as to receive a fuel feeding aggregate and feeding elements for filling said reservoir, said tubular cylinder part and said bottom part having joining surfaces in which functional surfaces and feeding passages are integrated.

* * * * *